(12) United States Patent
Timinger

(10) Patent No.: US 10,145,529 B2
(45) Date of Patent: Dec. 4, 2018

(54) OPTICAL LENS PACKAGE FOR AUTOMOTIVE LIGHTING APPLICATION

(71) Applicant: KONINKLIJKE PHILIPS N.V., Eindhoven (NL)

(72) Inventor: Andreas Lorenz Timinger, Aachen (DE)

(73) Assignee: Lumileds LLC, San, CA (US)

( * ) Notice: Subject to any disclaimer, the term of this patent is extended or adjusted under 35 U.S.C. 154(b) by 0 days.

(21) Appl. No.: 15/313,235

(22) PCT Filed: May 18, 2015

(86) PCT No.: PCT/EP2015/060826
§ 371 (c)(1),
(2) Date: Nov. 22, 2016

(87) PCT Pub. No.: WO2015/180979
PCT Pub. Date: Dec. 3, 2015

(65) Prior Publication Data
US 2017/0138558 A1    May 18, 2017

(30) Foreign Application Priority Data
May 30, 2014 (EP) .................. 14170532

(51) Int. Cl.
*G02B 19/00* (2006.01)
*F21S 43/20* (2018.01)
(Continued)

(52) U.S. Cl.
CPC ............ *F21S 43/26* (2018.01); *F21S 43/14* (2018.01); *G02B 19/0014* (2013.01); *G02B 19/0061* (2013.01); *F21Y 2115/10* (2016.08)

(58) Field of Classification Search
CPC ..................... F21S 48/2212; F21S 48/215
See application file for complete search history.

(56) References Cited

U.S. PATENT DOCUMENTS

2003/0058650 A1* 3/2003 Shih .............. H01L 33/647
362/294
2004/0029436 A1* 2/2004 Gasquet ............ F21S 48/215
439/490
(Continued)

FOREIGN PATENT DOCUMENTS

| CN | 101852385 A | 10/2010 |
|---|---|---|
| EP | 2735788 A2 | 5/2014 |
| WO | 2010111961 A1 | 10/2010 |

OTHER PUBLICATIONS

EPO as ISA, "International Search Report and Written Opinion" dated Aug. 7, 2015 from International Application No. PCT/EP2015/060826, filed May 18, 2015, 10 pages.
(Continued)

*Primary Examiner* — Donald Raleigh

(57) ABSTRACT

The present invention relates to an optical lens package, said lens package (1) having a lens body comprising a base (7), a central surface section (4) opposite to the base (7) and a peripheral surface section extending between the central surface section (4) and the base (7). The central surface section (4) is centered with respect to the optical axis (5) of the lens package (1) and has a convex shape in at least a first cross-sectional plane including the optical axis (5). At least a portion (6) of the peripheral surface section has a concave shape in said first cross-sectional plane. With such a design of the optical lens package (1) in addition to a central collimated light bundle with high luminous flux also side visibility is achieved by means of the concave portion (6) up to a high angle with respect to the optical axis (5). This side visibility is achieved without additional optics thus lowering the production costs of such an optical system compared to a solution using additional optics.

12 Claims, 2 Drawing Sheets

(51) Int. Cl.
*F21S 43/14* (2018.01)
*F21Y 115/10* (2016.01)

(56) References Cited

U.S. PATENT DOCUMENTS

| | | | |
|---|---|---|---|
| 2004/0201025 A1* | 10/2004 | Barnett | F21V 3/04 257/79 |
| 2006/0198147 A1* | 9/2006 | Ge | F21V 3/00 362/294 |
| 2008/0239722 A1 | 10/2008 | Wilcox | |
| 2008/0259629 A1* | 10/2008 | Takuwa | B60Q 1/2607 362/548 |
| 2010/0014295 A1* | 1/2010 | Shih | G02B 19/0028 362/311.02 |
| 2010/0073937 A1 | 3/2010 | Ho | |
| 2013/0051055 A1* | 2/2013 | Omidfar | B60Q 1/2611 362/520 |
| 2014/0009944 A1 | 1/2014 | Fukuda | |

OTHER PUBLICATIONS

Extended European Search Report dated Nov. 11, 2014, European Application No. 14170532.7, 5 pages.
First Office Action dated Jul. 30, 2018, China Patent Application No. 201580028877.4, 16 pages.

* cited by examiner

OPTICAL LENS PACKAGE FOR AUTOMOTIVE LIGHTING APPLICATION

CROSS-REFERENCE TO RELATED APPLICATIONS

The present application is a § 371 application of International Application No. PCT/EP2015/060826 filed on May 18, 2015 and entitles "OPTICAL LENS PACKAGE FOR AUTOMOTIVE LIGHTING APPLICATION," which claims the benefit of European Patent Application No. 14170532.7, filed May 30, 2014. International Application No. PCT/EP2015/060826 and European Patent Application No. 14170532.7 are incorporated herein.

BACKGROUND OF THE INVENTION

The present invention relates to an optical lens package, in particular for LED light sources, said lens package having a lens body comprising a base, a central surface section opposite to the base and a peripheral surface section extending between the central surface section and the base, said central surface section being centered with respect to an optical axis of the lens package and having a convex shape in at least a first cross-sectional plane including the optical axis.

A main application field of the present invention is the field of automotive signal lighting. In automotive signal lighting many test scenarios require side visibility of the emitted light. This means, that at least in one cross-section of directional space, light has to be directed to high angles with respect to the central lighting direction or axis to provide visibility from e.g. −85° to 85°, whereas the central light bundle of high intensity values extends only from e.g. −20° to 20°, measured from the central axis. LED packages (LED: light emitting diode) are well known, which provide a good central light bundle for automotive signaling requirements, extending e.g. from −20° to 20° from the central axis.

Using automotive signaling LEDs with package optics, no additional separate optics is necessary to form a good legal bundle of light with a reasonable number of LEDs and moderate luminous flux. U.S. Pat. No. 7,993,035 B2 discloses an aspherical LED angular lens for narrow distribution patterns. This aspherical lens has a concave shape at the entrance side and a convex surface shape at the opposite side of the lens. By using such an aspherical shape the light emitted by the light source is collimated to achieve a narrow angular circle-distribution pattern which is greater than 15° and smaller than 30°. Such an optical lens package however does not fulfill side visibility requirements. Additional secondary optics is needed to divert light into directions far from the optical axis, e.g. extending up to +/−85°. The additional effort to provide side visibility optics can be significant thus increasing the costs of such an optical system.

US 2008/0239722 discloses a LED apparatus for illumination provided with a first lens positioned over the LED and a secondary lens surrounding the primary lens. The primary lens has a central axis. The secondary lens has a principal perimeter surface with a reference axis parallel to and at distance of the central axis. The principal perimeter surface projects downwardly and inwardly to a ridgeline. The ridgeline subtending a substantial angle about the central axis. Due to the principal perimeter surface, the apparatus for illumination has a preference side to which the light is directed in a laterally biased direction and little or no light is being directed toward the non-preferential sides.

SUMMARY OF THE INVENTION

It is an object of the present invention to provide an optical lens package, in particular for automotive lighting applications with LEDs or other small light sources, which in addition to a narrow central light bundle also comprises side visibility without significant additional costs.

The object is achieved with the optical lens package according to claim 1. Advantageous embodiments of the lens package are subject of the dependent claims or are described in the subsequent portions of the description and preferred embodiments. The invention also relates to an optical module and to a signaling device comprising LED-chips with said optical lens package.

The proposed optical lens package has an optically transparent lens body which comprises a base, a central surface section opposite to the base and a peripheral surface section extending between the central surface section and the base. The central surface section is centered with respect to the optical axis of the lens package and has a convex shape in at least a first cross-sectional plane including the optical axis. The optical lens package is characterized in that at least a portion of the peripheral surface section has a concave shape in said first cross-sectional plane. The term "base" in this context is not restricted to any geometrical form but only denotes the side of the lens body opposite to the central surface section. This optical lens package is preferably used with a LED or LED module as the light source. The central convex surface section produces an at least partly collimated bundle of light in the corresponding cross-sectional plane. The concave portion of the peripheral surface section adds a secondary bundle of light in the corresponding cross sectional plane with significantly lower intensity over a wide angular spread.

Due to this angular spread of the light entering the concave portion, the required side visibility of the emitted light is provided which can reach up to e.g. +/−85° from the optical axis depending on the design of the concave portion. Since the proposed optical lens package does not require any additional optics, the side visibility can be provided without significant additional costs. The lens package can be fabricated in a known manner by a molding process or also with other techniques, e.g. by single point diamond milling or by free-form manufacturing using laser ablation.

In a preferred embodiment, the proposed optical lens package is implemented in a single LED, in a module containing one or several LEDs in one unit or in a luminaire containing one or several LEDs. The lens package preferably encloses part of a chip carrier carrying a LED chip, i.e. the LED chip is completely immersed in the transparent lens body of the lens package. A corresponding optical module preferably comprises several LED-chips, each LED-chip being mounted on a separate chip carrier or on a chip carrier common to several or all of said LED-chips. Each of the LED-chips then comprises the proposed lens package. The lens package may be attached to the LED-chip or chip carrier or the LED-chip together with the chip carrier is enclosed, e.g. cast, by the lens package. Such an optical module may be part of a signaling device, e.g. a turn light.

The central surface section can be designed to have an overall convex shape and can also be designed to provide the complex shape only in one (the first) cross-sectional plane. The same applies to the concave portion of the peripheral section. The lens package can be of rotationally symmetric or elliptic shape. Also other shapes are possible. An elliptic shape is generated by having two perpendicular different defining cross-sections, both containing the optical axis. The surface of the lens is then defined by an elliptical interpolation between these two defining cross-sections. The elliptical lenses are used to form asymmetric bundles of light, which have different extents in the cross-sectional planes of the two defining cross sections, in the present invention also called first and second cross-sectional planes. A lens according to the invention has at least one cross-section (first cross-section) with a central convex and a peripheral concave section. The lens may be rotationally symmetric with this cross-section according to the invention. The lens may also be of elliptic shape with one of the defining cross-sections according to the invention, i.e. convex central surface section and concave peripheral portion, and the other defining cross-section with only the convex central surface section. The lens may also be of elliptic shape with both of the defining cross-sections according to the invention, i.e. convex and concave shape, but the concave shapes in both cross-sections being different of each other and the convex shapes in both cross sections being also different of each other. The choice of the shape of the lens package depends on the desired beam pattern and side visibility.

The lens package is preferably designed for an application in which the light source is arranged on the optical axis at a designated position. This designated position may be inside of the lens body, when the light source is immersed in the lens body, or may also be outside of the lens body close to the base. In the latter case, preferably an immersion medium, e.g. silicone, is arranged between the light source and the base in order to avoid reflection of light at the entrance in the lens body. The central surface section is then preferably designed to collect light emitted by the light source between an angle of 0° and an angle of between 45° and 60° with respect to the optical axis and to collimate this collected light to an angle of between 10° and 35° with respect to the optical axis. The convex shaped surface section thus partly collimates this collected light to a central light bundle of high luminous flux. The concave portion is designed to collect light emitted by the light source between an angle of between 45° and 60° (depending on the collection angle of the convex shaped section) and an angle of between 60° and 75° with respect to the optical axis, and to spread this collected light to leave the lens package at a maximum angle of between 60° and 85° with respect to the optical axis. This can be achieved by appropriately arranging and dimensioning the concave portion to collect the light emitted from the light source under the above angle ranges, and by choosing the curvature of the concave portion appropriately for the desired spreading of the light to achieve the desired secondary light bundle with the above maximum emission angle.

The amount of light in the central (collimated) light bundle influenced by the convex shaped surface section is typically between 70% and 95% of the light in the full light bundle, i.e. the combination of the central and the secondary light bundles. The difference in luminous intensity on axis to intensity inside the peripheral secondary bundle is in the range of 10:1 up to 1000:1.

The proposed optical lens package is preferably used in automotive signal lighting. Nevertheless, the lens package may also be used in other lighting applications, in particular in all fields in which a central bundle of light is confined to a cone of less than +/−30° and a secondary bundle of light is required extending significantly beyond said angle. The central light bundle uses the main part of the total light flux and the secondary light bundle takes only a small fraction of the total light flux.

BRIEF DESCRIPTION OF THE DRAWINGS

The proposed optical lens package is described in the following by way of examples in connection with the accompanying figures. The figures show.

DETAILED DESCRIPTION OF THE INVENTION

Figure 1:
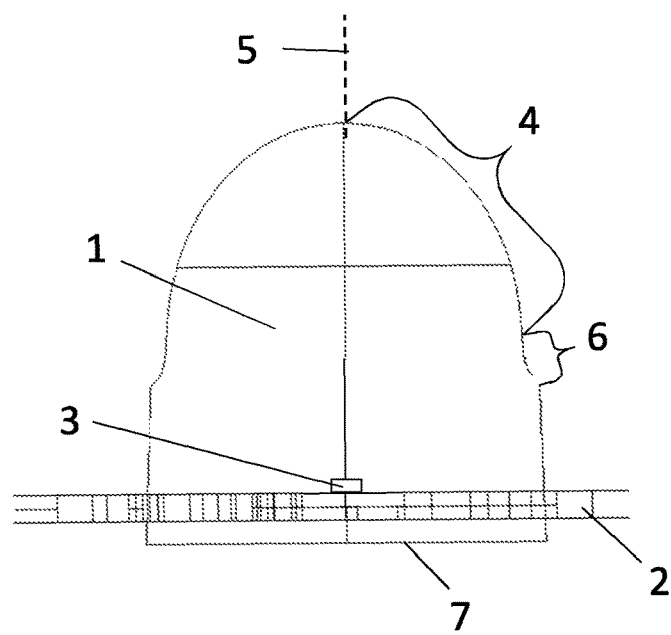
FIG. 1 a cross-sectional view of an example of the proposed optical lens package.

FIG. 1 shows a cross-sectional view of an example of the proposed optical lens package 1 which in this example partly encloses a chip carrier 2 which carries a LED-chip 3 as the light source. The LED-chip 3 is completely immersed in the lens body of the optical lens package 1. This optically transparent lens body has a convex shaped central surface section 4 which is arranged opposite to the base 7 of the lens body and centered with respect to the optical axis 5 of the lens package. In extension of the convex shaped surface section 4, the lens body also comprises a peripheral surface section with a concave shaped portion 6 which in this case directly adjoins the convex shaped central surface section 4. This concave shaped portion 6 of the lens body is dedicated to provide light for a secondary peripheral bundle of light with wide angular range. The central convex shaped surface section 4 produces a central collimated bundle of light. The concave shaped portion 6 adds the secondary bundle of light with significantly lower intensity over a wide angular spread.

Figure 2:
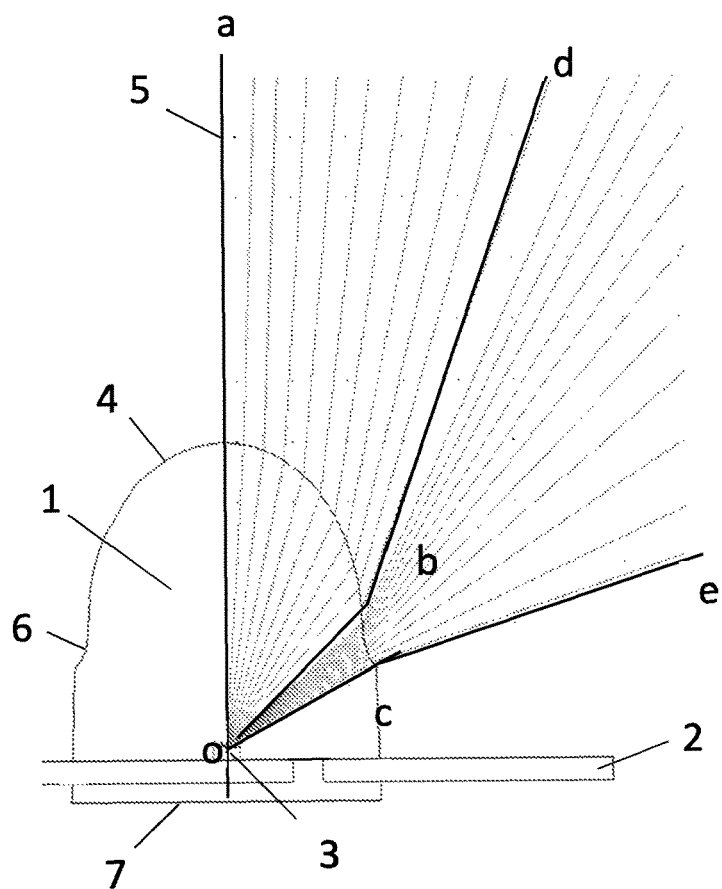
FIG. 2 a cross-sectional view of an example of the proposed optical lens package showing passages of different light rays of the light source.

FIG. 2 shows a view of the passage of exemplary light rays emitted by the light source (LED-chip 3). The light rays emitted by the light source are refracted when they pass through the surface of the lens body. The convex shaped central surface section 4 of the lens body starts on the optical axis 5 (line o-a) and extends to line o-b. Although this only refers to the right side of the cross-sectional view of the lens package, the same applies symmetrically to the left side. The angle between the optical axis 5 and line o-b is typically in the range between 45° and 60°. The concave portion 6 of the lens body in this cross-sectional plane starts at point b and extends to line o-c. The angle between line o-c and the optical axis 5 is typically between 60° and 75°. As can be seen from the figure, the convex shaped central surface section 4 forms a collimated bundle of light with the outer ray on line b-d produced from the ray on line o-b by refraction at the surface. The angle of line b-d to the optical axis is typically between 10° and 35°. The concave portion 6 forms a spread bundle of light with the outer ray on line c-e produced from ray on line o-c by refraction at the surface. The angle of line c-e to the optical axis 5 is typically between 60° and 85°. As can be seen from this figure, the concave portion 6 spreads a small portion of light emitted by the light source 3 at point o so that the maximum angle with respect to the optical axis 5 is increased thus increasing the side visibility of the emitted light to such large angles.

Figure 3:
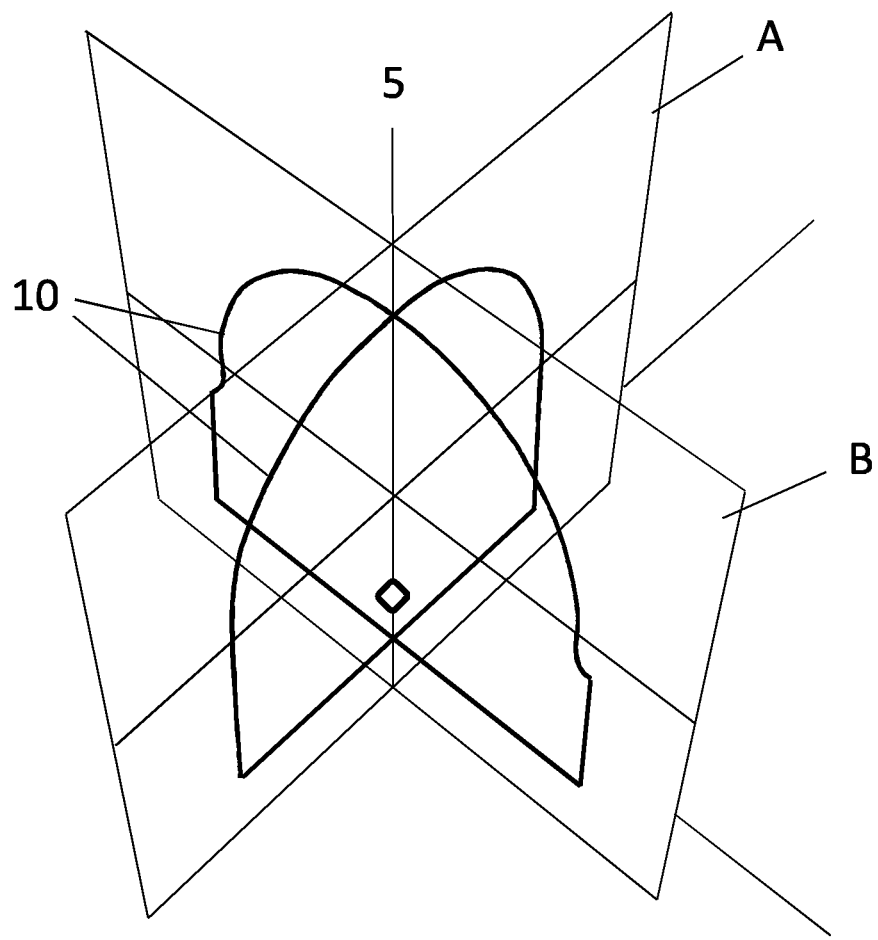
FIG. 3 a schematical view of an embodiment of the proposed optical lens package with two different cross-sections.

FIG. 3 shows a view of two perpendicular cross-sectional planes A, B of the proposed optical lens package. Both cross-sectional planes A, B include the optical axis 5. The proposed optical lens package can be designed in different manners with respect to these two cross-sectional planes. Since the lens body of the proposed lens package must have one cross-section which has a central convex shaped and a peripheral concave shaped portion, three different configurations are possible:
a) The lens is rotationally symmetric with a cross-section having the convex shaped and concave shaped portions according to the invention.
b) The lens is of elliptic shape with one of the defining cross-sections (first cross-section) according to the invention, i.e. having the convex shaped and concave shaped portions, and the other defining cross-section (second cross-section) only comprising the convex shaped portion and not the concave shaped portion. An example of such an embodiment is shown in FIG. 3 with the first cross-section in cross-sectional plane B and the second cross-section in cross-sectional plane A.
c) The lens is of elliptic shape with both of the defining cross-sections according to the invention, i.e. having the convex shaped and concave shaped portions, but being different to each other. This means that the convex shaped portions in the two cross-sectional planes A and B are different from each other. The concave shaped portions in the two cross-sectional planes A and B in this case may also be different from each other.

While the invention has been illustrated and described in detail in the drawings and forgoing description, such illustration and description are to be considered illustrative or exemplary and not restrictive. The invention is not limited to the disclosed embodiment. Other variations to the disclosed embodiments can be understood and effected by those skilled in the art in practicing the claimed invention, from a study of the drawings, the disclosure and the appended claims. In the claims the word "comprising" does not exclude other elements or steps, and the indefinite article "a" or "an" does not exclude a plurality. The mere fact that certain measures are recited in mutually different dependent claims does not indicate that a combination of these measures cannot be used to advantage. In particular the features of claims 8 to 10 can be freely combined with each other and with the features of all of the other claims. Any reference signs in the claims should not be construed as limiting the scope of the invention.

LIST OF REFERENCE SIGNS 1 optical lens package
2 chip carrier
3 LED-chip
4 convex shaped central surface section
5 optical axis
6 concave shaped portion
7 base
A first cross-sectional plane
B second cross-sectional plane

The invention claimed is:
1. Optical lens package having a lens body comprising a base, a central surface section opposite to the base, an optical axis and a peripheral surface section extending between the central surface section and the base,
said central surface section at least partly having a convex shape in at least a first cross-sectional plane including the optical axis,
wherein the central surface section is centered with respect to the optical axis of the lens package;
wherein, at a location of a transition of the peripheral surface section into the central surface section, at least a portion of said peripheral surface section has a concave shape in at least said first cross-sectional plane;
wherein, when a light source is arranged at a designated position on the optical axis,
the central surface section is configured to collimate light received from the light source at a smaller angle with respect to the optical axis than an angle of the light collected by the concave shaped portion of the peripheral surface section with respect to the optical axis, and
the concave shaped portion is configured to spread the light collected by it from the light source.

2. Lens package according to claim 1, wherein said central surface section has convex shapes in all cross-sectional planes including the optical axis.

3. Lens package according to claim 2, wherein said portion of said peripheral surface section has a concave shape in a second cross-sectional plane including the optical axis, said second cross-sectional plane being perpendicular to said first cross-sectional plane.

4. Lens package according to claim 3, wherein the concave shape of said portion of said peripheral surface section is different in said first and second cross-sectional planes.

5. Lens package according to claim 3, wherein the concave shape of said portion of said peripheral surface section is identical in said first and second cross-sectional planes.

6. Lens package according to claim 4, wherein the convex shape of said central surface section is different in said first and second cross-sectional planes.

7. Lens package according to claim 5, wherein the convex shape of said central surface section is identical in said first and second cross-sectional planes.

8. Lens package according to claim 1, wherein said central surface section is designed to collect light emitted by the light source between an angle of 0° and an angle of between 45° and 60° with respect to the optical axis, when said light source is arranged at the designated position on the optical axis, and to collimate said collected light to an angle of between 10° and 35° with respect to the optical axis.

9. Lens package according to claim 1, wherein said portion of said peripheral surface section is designed to collect light emitted by the light source between an angle of between 45° and 60° and an angle of between 60° and 75° with respect to the optical axis, when said light source is arranged at the designated position on the optical axis, and to spread said collected light to leave the lens package at a maximum angle of between 60° and 85° with respect to the optical axis.

10. Lens package according to claim 1, wherein said lens package encloses or is attached to a LED-chip mounted on a chip carrier, the LED-chip forming said light source.

11. Optical module comprising several LED-chips, each LED-chip being mounted on a separate chip carrier or on chip carriers common to several of said LED-chips, wherein a lens package according to claim 1 encloses or is attached to each of said LED-chips.

12. Signaling device comprising one or several LED-chips, wherein a lens package according to claim 1 encloses or is attached to each of said LED-chips.

* * * * *